(12) United States Patent
Williams

(10) Patent No.: US 11,687,760 B2
(45) Date of Patent: Jun. 27, 2023

(54) VIRTUAL LIGHTING ASSISTANT (VLA) AGENT IN AN ADAPTIVE LIGHTING SYSTEM

(71) Applicant: Ross Williams, Ltd., Aylesbury (GB)

(72) Inventor: Ross Williams, Aylesbury (GB)

(73) Assignee: Ross Williams, Ltd., Aylesbury (GB)

( * ) Notice: Subject to any disclaimer, the term of this patent is extended or adjusted under 35 U.S.C. 154(b) by 712 days.

(21) Appl. No.: 16/822,920

(22) Filed: Mar. 18, 2020

(65) Prior Publication Data

US 2020/0387774 A1 Dec. 10, 2020

Related U.S. Application Data

(60) Provisional application No. 62/857,396, filed on Jun. 5, 2019.

(51) Int. Cl.
*H05B 47/155* (2020.01)
*H05B 47/165* (2020.01)
*G06N 3/042* (2023.01)
*G06N 3/08* (2023.01)
*G06N 3/044* (2023.01)
*G06N 3/045* (2023.01)

(52) U.S. Cl.
CPC ............ *G06N 3/042* (2023.01); *G06N 3/044* (2023.01); *G06N 3/045* (2023.01); *G06N 3/08* (2013.01); *H05B 47/155* (2020.01)

(58) Field of Classification Search
CPC .. H05B 47/105; H05B 47/155; H05B 47/165; Y02B 20/40; G06N 3/042; G06N 3/044; G06N 3/045; G06N 3/08; G05B 15/02; G05B 2219/2642
See application file for complete search history.

(56) References Cited

U.S. PATENT DOCUMENTS

| | | | | |
|---|---|---|---|---|
| 10,896,537 B2* | 1/2021 | Buys | ........................ | G06T 17/20 |
| 11,006,505 B2* | 5/2021 | Mizerak | ................ | F21S 10/023 |
| 2012/0169616 A1* | 7/2012 | Adenau | ............... | G06F 3/04886 |
| | | | | 345/173 |
| 2015/0220073 A1* | 8/2015 | Lyman | ............... | G05D 23/1927 |
| | | | | 700/275 |
| 2018/0281673 A1* | 10/2018 | Garing | ................... | B64D 47/02 |

FOREIGN PATENT DOCUMENTS

WO 2015116773 A1 8/2015

OTHER PUBLICATIONS

United Kingdom Search and Examination Report; Application No. GB2008405.9; dated Nov. 19, 2020; 6 pages.

* cited by examiner

*Primary Examiner* — Haissa Philogene
(74) *Attorney, Agent, or Firm* — Conley Rose, P.C.; Brooks W Taylor

(57) ABSTRACT

A method performed by a virtual lighting assistant (VLA) agent of an adaptive lighting system, comprising obtaining a plurality of previous tasks from a console over a period of time, wherein a task comprises a sequence of one or more commands, maintaining access to historical data, telemetry data, context data, and a fixture library associated with the console, wherein the historical data comprises the previous tasks, determining a recommendation for a next task based on the fixture library and at least one of the historical data, the telemetry data, or the context data, and causing the recommendation for the next task to be displayed to an operator of the console.

20 Claims, 12 Drawing Sheets

VIRTUAL LIGHTING ASSISTANT (VLA) AGENT IN AN ADAPTIVE LIGHTING SYSTEM

CROSS-REFERENCE TO RELATED APPLICATIONS

The present application claims the benefit of U.S. Provisional Patent Application No. 62/857,396 filed Jun. 5, 2019, by Ross Williams, and entitled "Adaptive Digital Light Agent," which is incorporated herein by reference as if reproduced in its entirety.

TECHNICAL FIELD OF THE DISCLOSURE

The disclosure generally relates to a lighting system and, more specifically to a virtual lighting assistant (VLA) agent of a lighting system.

BACKGROUND

Lighting control consoles (also known as light boards, lighting boards, or lighting desks) are electronic devices utilized in theatrical lighting design to control multiple lights at once. They are used throughout the entertainment industry and are typically placed at the Front of House ("FOH") position or in a control booth.

The light board operator (also referred to as a "Light Op" or "Board Op", or as "moving light programmer"), is a user who operates and/or programs the light board. Depending on the scale and type of production, the light board operator may be responsible for conventional and/or automated lighting devices, and in some instances, controlling video. The light board operator is well versed in the intricacies of a wide variety of lighting instruments and control consoles, and able to program complex lighting cues involving multiple devices and other components.

SUMMARY

In an embodiment, a method performed by a virtual lighting assistant (VLA) agent of an adaptive lighting system is disclosed. The method comprises obtaining a plurality of previous tasks from a console over a period of time, wherein a task comprises a sequence of one or more commands, maintaining access to historical data, telemetry data, context data, and a fixture library associated with the console, wherein the historical data comprises the previous tasks, determining a recommendation for a next task based on the fixture library and at least one of the historical data, the telemetry data, or the context data, and causing the recommendation for the next task to be displayed to an operator of the console.

In another embodiment, a VLA agent implement by a console is disclosed. The VLA agent comprises a memory comprising instructions, and a processor coupled to the memory and configured to execute the instructions, which cause the processor to be configured to monitor a plurality of previous tasks executed by the console over a period of time, wherein a task comprises a sequence of one or more commands, store historical data, telemetry data, context data, and a fixture library associated with the console, wherein the historical data comprises the previous tasks, determine a recommendation for a next task based on the fixture library and at least one of the historical data, the telemetry data, or the context data, and display the recommendation for the next task on a user interface of the console.

In yet another embodiment, a VLA agent implemented in an adaptive lighting system is disclosed. The VLA agent comprises a memory configured to store instructions, and a processor coupled to the memory and configured to execute the instructions, which cause the processor to be configured to obtain a plurality of previous tasks from a console over a period of time, wherein a task comprises a sequence of one or more commands, maintain access to historical data, telemetry data, context data, and a fixture library associated with the console, wherein the historical data comprises the previous tasks, receive a recommendation for a next task from a VLA server, wherein the recommendation for the next task is based on the fixture library and at least one of the historical data, the telemetry data, or the context data, and transmit the recommendation for the next task to the console for display to an operator of the console.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

The present subject matter will now be described with reference to the attached figures. Various structures and methods are schematically depicted in the figures for purposes of explanation only and so as to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. To the extent that a term or phrase is intended to have a special meaning, i.e., a meaning other than its ordinary meaning or as understood by skilled artisans, such a special definition will be expressly set forth in the specification in a definitional manner that directly and unequivocally provides the special definition for the term or phrase.

In the following detailed description, various details may be set forth in order to provide a thorough understanding of the various exemplary embodiments disclosed herein. However, it will be clear to one skilled in the art that some illustrative embodiments may be practiced without some of the various disclosed details. Furthermore, features and/or processes that are well-known in the art may not be described in full detail so as not to unnecessarily obscure the disclosed subject matter.

The present disclosure relates generally to predicting and dynamically adapting the most appropriate programming strategies that aid an individual lighting control operator (e.g., a light board operator/programmer) of a lighting system.

Figure 1:
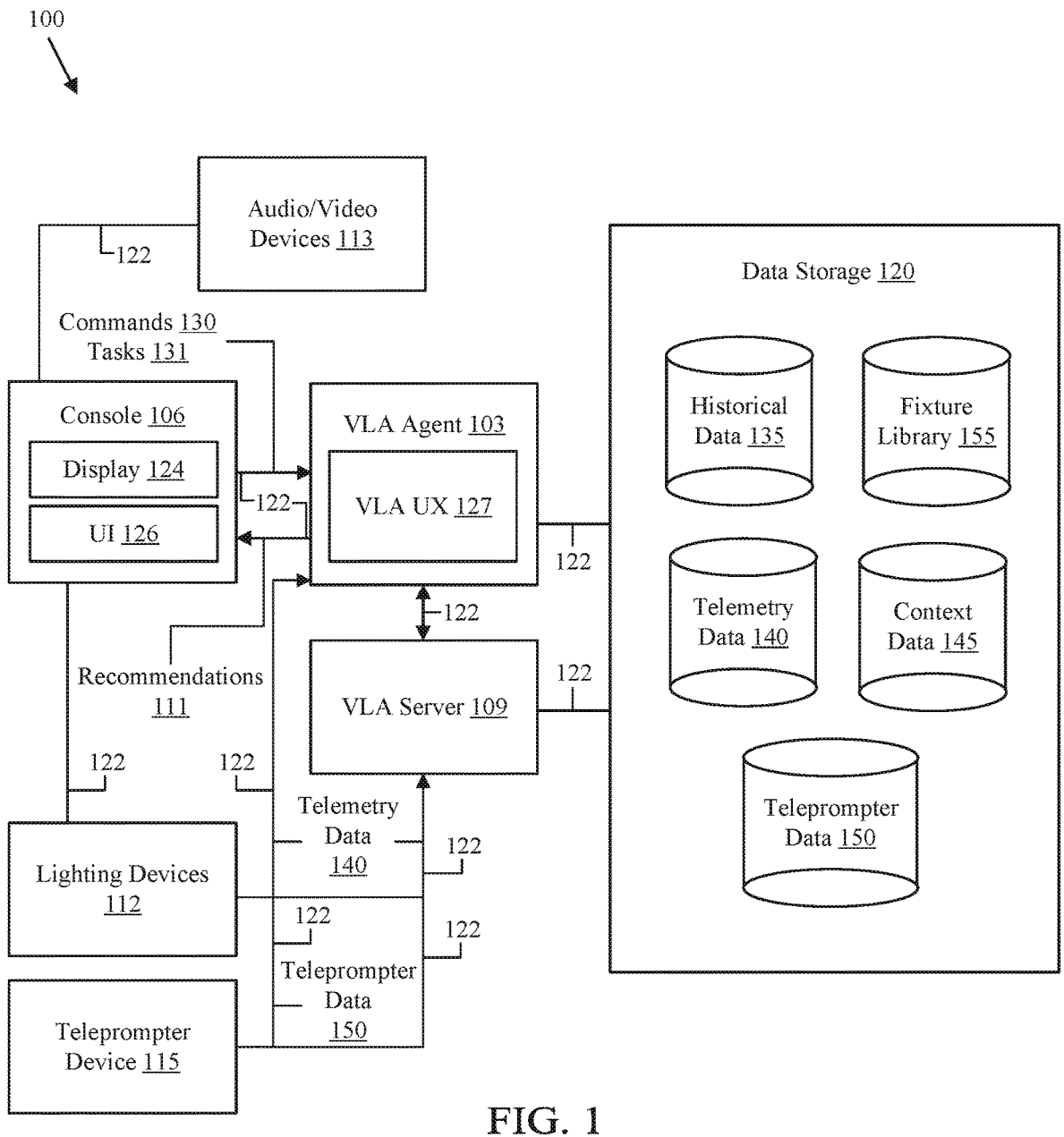
FIG. 1 illustrates an adaptive lighting system in accordance with an embodiment of the disclosure.

FIG. 1 illustrates an adaptive lighting system 100 in accordance with an embodiment of the disclosure. The adaptive lighting system 100 includes a VLA agent 103, a console 106, a VLA server 109, lighting devices 112, audio/video devices 113, a teleprompter device 115, and a data storage 120. The VLA agent 103, console 106, VLA server 109, lighting devices 112, teleprompter device 115, and data storage 120 are interconnected via links 122. Links 122 may be wired links, wireless links, or other suitable interfaces interconnecting the VLA agent 103, console 106, VLA server 109, lighting devices 112, audio/video devices 113, teleprompter device 115, and data storage 120. In some cases, there may be other devices or networks, such as the Internet, interconnecting one or more of the VLA agent 103, console 106, VLA server 109, lighting devices 112, audio/video devices 113, teleprompter device 115, and data storage 120. For example, the VLA server 109 and/or the data storage 120 may be implemented by a cloud server that is geographically remote from the console 106 and the lighting devices 112. As should be appreciated, the adaptive lighting system 100 may include other components that are not otherwise shown by FIG. 1.

The console 106 (also referred to as a "lighting console," "lighting controller," "lighting control console," or "programmable logic controller (PLC)") is an electronic device used in theatrical lighting design to control multiple lighting devices 112. Consoles 106 are generally used throughout the entertainment industry, and placed at the front of house position or in a control booth. For example, the console 106 controls an intensity, color, and/or gobo pattern of the lighting devices 112. The lighting devices 112 include, for example, standard lights, intelligent lights, and strobe lights. In some cases, the lighting devices 112 may also refer to other special effect devices and/or playback devices, such as, for example, fog machines, hazers, special effects devices, or audio/video devices 113.

The console 106 communicates with the lighting devices 112 and other devices in the adaptive lighting system 100 via an electronic control protocol, such as, for example, DMX512 (Digital Multiplex), 0-10 V analog lighting control, Architecture for Control Networks (ACN), or DMX512-A. Different consoles 106 of different adaptive lighting systems 100 may implement different electronic control protocols based on the manufacturer of the consoles 106 and/or the lighting devices 112.

With regard to a recorded or live television show, the console 106 may also be used to control playback for one or more segments of the television show, by executing cues for a particular scripted sequence. The cues are used to perform a task 131, which can control the lighting devices 112 or the audio/video devices 112 for a segment. The segment may be identified by teleprompter data 150, which will be described in further detail below.

The console 106 includes a display 124 and a user interface (UI) 126. The display 124 is a screen attached to the console 106 that presents information to an operator of the console 106. The display 124 may be part of the console 106 or external to the console 106. The UI 126 is presented on the display 124 and is an interface by which the operator can make selections, enter information, or interact with the console 106.

Programming the lighting at events (or shows) may include sequences of repetitive tasks 131, in which a task is a sequence of one or more commands 130. Commands 130 refer to the commands that are entered to program the show, and commands that are entered to execute the cues and perform the show. Each task 131 is repetitive in format with variations of specific functions or elements relating to the various attributes of the lighting devices 112. An operator of the console 106 must typically manually enter commands 130 and parameters into the console 106 to perform a task 131. For example, in some applications, the same theatrical performance is performed in the same theater using the same console type by one or more operators several days of the week. However, each time the theatrical performance is performed, the operator of the console 106 must manually program the tasks 131 for a show, and then the programmed show is executed at each performance by executing relevant cues. The operator must pay close attention to the entire show and the timings to ensure that the commands 130 are entered and the tasks 131 are performed at precisely the correct time. From the perspective of the operator, manually entering commands 130 every night for the same show is largely inefficient and redundant.

The embodiments of the present disclosure are directed to reducing this burden on the operator of the console 106 by dynamically determining recommendations 111 for commands or tasks that are to be performed for an event based on data stored at the data storage 120. These recommendations 111 are then presented to the operator slightly before the time at which the command should be executed, such that the operator can select whether or not to execute the command or task.

In some embodiments, the adaptive lighting system 100 includes the VLA agent 103. The VLA agent 103 is a device or software process that monitors and collects tasks 131 performed by one or more consoles 106, determines recommendations 111 for next tasks 131, and presents the recommendations 111 to the operator of the console 106. In some embodiments, the VLA agent 103 learns frequent tasks 131, and predicts, based on this learning, the next sequence of tasks 131. The VLA agent 103 recognizes commands 130 and syntax on a cross-platform basis. The VLA agent 103 includes a VLA UX 127, which is a user interface by which a user, such as an operator, can interact with the VLA agent 103. The VLA agent 103 may be an electronic device separate from the console 106, or may be implemented as a software program running on the console 106. In some embodiments, the VLA agent 103 may be executed at a cloud server, such that the console 106 communicates with the cloud server to determine recommendations for tasks 131 that are to be performed for an event.

To predict recommendations 111 for next tasks 131, the VLA agent 103 is configured to obtain previous tasks 131 that have being executed by the console 106 and performed by the lighting devices 112 during a period of time. The tasks 131 pertain to specific parameters associated with the lighting devices 112, such as, for example, a position, light path, light speed, dim level, iris, color, gobo, strobe, strobe speed, media file, effect, orientation, altitude, or spatial information within the lighting rig.

In the case that the VLA agent 103 is an electronic device separate from the console 106 or is executed by a cloud server, the VLA agent 103 receives multiple previous tasks 131 that have been executed by the console 106 for a period of time. In the case that the VLA agent 103 is software being executed in the background of the console 106, the VLA agent 103 monitors the tasks 131 that are being executed by the console 106 during the period of time. For example, the VLA agent 103 monitors keystrokes received at the console 106 during the time period to obtain the previous tasks 131. The period of time may refer to one or more events or shows during which lighting is being controlled using the console 106.

While obtaining the previous tasks 131 from the console 106, the VLA agent 103 also associates these commands with timing data, indicating a time or time period during which the task 131 is being performed. For example, the VLA agent 103 determines that a lighting command 130 focuses the light in the theater seating area at 6:00 PM every night Monday through Thursday, which is when the audience enters the theater for a show.

In some embodiments, the VLA agent 103 stores the previous tasks 131 obtained by the console 106 into the data storage 120. The data storage 120 includes data that is used to determine a recommendation 111 for a next task 131 that should be executed by the console 106. The data storage 120 is a memory or a collection of memories accessible by the VLA agent 103, the console 106, and/or the VLA server 109. In some embodiments, the data storage 120 is stored locally at the electronic device implementing the VLA agent 103. In other embodiments, the data storage 120 may be stored on a remote cloud server such that the VLA agent 103 accesses the data in the data storage 120 over the Internet. In some embodiments, the data that is used to determine a recommendation 111 for a next task 131 includes historical data 135, telemetry data 140, context data 145, teleprompter data 150, and a fixture library 155.

In some embodiments, the historical data 135 includes the previous tasks 131 executed by the console 106. The tasks 131 are each respectively stored in association with the timing data, indicating a time at which each of the tasks 131 are performed with respect to a show, event, or calendar time period. Continuing with the example above, the historical data 135 includes the lighting command 130 directed to focusing the light in the theater seating area and the timing data describing when the lighting command 130 is typically performed.

In other embodiments, the historical data 135 stores various types of data associated with different operators of the console 106 and different events controlled by the console 106. The historical data 135 may include data related to the previous tasks 131 executed for a single event. The historical data 135 may include data related to the previous tasks 131 executed for multiple different events. The historical data 135 may include data related to the previous tasks 131 executed for an event by a single operator. The historical data 135 may include data related to the previous tasks 131 executed for the single event by multiple different operators. The historical data 135 may include data related to the previous tasks 131 executed for multiple different events by multiple different operators. In all of these cases, the data related to the previous tasks 131 includes timing data, which the VLA agent 103 uses to determine a repetitive nature of the tasks 131.

The telemetry data 140 describes positional features of the lighting devices 112 on a lighting rig. The telemetry data 140 provides situational awareness of a specific and relational telemetry of the lighting devices 112 within a lighting rig. For example, the telemetry data includes at least one of a position, a light path, a light speed, a dim level, an iris, a color, a gobo, a strobe, a strobe speed, a media file, effects, an orientation, an altitude, and spatial information of the lighting devices 112.

In some embodiments, the VLA agent 103 receives telemetry data 140 from the lighting devices 112 and stores the telemetry data 140 at the data storage 120. For example, the VLA agent 103 gathers location data or spatial data (via the Global Positioning System (GPS), for example) from lighting devices 112 to identify spatial patterns within the syntax of any operative commands 130 directed to lighting devices 112 (for example, lighting devices 112 positioned in a circular pattern). Alternatively, the data storage 120 may be pre-configured with the telemetry data 140 for each of the lighting devices 112. The tasks 131 that are subsequently suggested to the operator pertain to implementations of specific parameters relating to lighting devices 112, such as, for example, the position, the light path, the light speed, the dim level, the iris, the color, the gobo, the strobe, the strobe speed, the media files, the effects, the orientation, the altitude, and/or the spatial information of the lighting devices 112 within the lighting rig.

The context data 145 includes data related to environmental factors or pre-configured data related to the previous tasks 131 performed by the console 106. The environmental factors may include factors related to an environment during which a task 131 is performed. The environment factors may be obtained by an application installed at the VLA agent 103. For example, when the VLA agent 103 includes a weather application, the data obtained from the weather application may be used to determine environmental factors related to previous tasks 131 performed by the console 106. For example, the data obtained from a weather application may include a current local weather, a season, a weather degree range, a local sunrise time, a local sunset time, etc.

In some embodiments, the VLA agent 103 obtains the environmental factors associated with a task 131 being performed by the console 106 and stores the environmental factors into the context data 145. For example, the VLA agent 103 obtains a current weather at a time when a task 131 is executed. The VLA agent 103 stores the current weather in association with the particular task 131 that was executed.

In some embodiments, the pre-configured data stored in the context data 145 may include calendar based data, which may also be obtained using an application installed at the VLA agent 103, such as a calendar application or a clock application. When the VLA agent 103 includes the calendar application and clock application, the data obtained by the calendar application and the clock application may be used to determine the pre-configured data related to previous tasks 131 performed by the console 106. For example, the data obtained from a calendar application may be used to indicate that a task 131 is repetitively performed on a particular day of the week, a month, a year, or a holiday. Similarly, the data obtained from a clock application may be used to indicate that a task 131 is repetitively performed at a particular time, or time period, of a day.

In some embodiments, the pre-configured data stored in the context data 145 includes geographical situational awareness data. The geographical situational awareness data includes data related to a particular location at which the console 106 was used to perform tasks 131 for an event. For example, the geographical situational awareness data includes information related to a particular venue at which the console 106 performed tasks 131 for an event, such as, for example, a maximum stage width or a rigging height. As another example, the geographical situational awareness data includes information related to timings during which the console 106 performed tasks 131 for an event. For example, the geographical situational awareness data indicates that a first task 131 was executed at sunrise and second task 131 was executed at sunset for an event occurring at a particular location. As another example, the geographical situational awareness data includes local language information that is compatible with a console 106 at a particular location. As another example, the geographical situational awareness data includes data regarding a time zone in which the console 106 is operating The geographical situational awareness data may also include video or other technical standards such as frame rates, and local legislation restrictions that apply to a particular location (e.g., country). For example, certain countries may have technical standards for specific frame rates, and the geographical situational awareness data indicates this frame rate in association with the country. Certain locations may also have local legislation restrictions regarding the light pollution that may interfere with air flight or military operations. The geographical situational awareness data indicates these local legislation restrictions in association with the locations.

In some embodiments, the fixture library 155 includes multiple functions that are compatible with software implemented by the console 106. For example, a console 106 communicates with the lighting devices and other devices in the adaptive lighting system 100 via an electronic control protocol, such as, for example, DMX512 and 0-10 V analog lighting control, ACN, or DMX512-A. Different consoles 106 and lighting devices 112 from different manufacturers implement different electronic control protocols. The libraries, functions, variables, and relevant data included in the fixture library 155 may be pre-configured by a manufacturer of the console 106 and/or the lighting devices 112. The fixture library 155 includes the libraries, functions, variables, and relevant data used by the particular console 106, or called upon by the console 106, to control the particular lighting devices 112 in the adaptive lighting system 100. The fixture library 155 is pre-configured at the data storage 120 when the console 106 and/or lighting devices 112 are specified for the adaptive lighting system 100.

In some embodiments, the teleprompter data 150 includes teleprompter scripts, sequences, and/or cues associated with each of the sequences. The teleprompter script may include text containing segments from a show script and running order. In some such embodiments, the VLA agent 103 receives the teleprompter data 150, particularly the teleprompter script, from the teleprompter device 115 (also referred to as an "auto-cue"). In such embodiments, the teleprompter data 150 is received before the teleprompter script is displayed to a broadcaster who is using the teleprompter device 115. Alternatively, the teleprompter data 150 may be received in real-time as the teleprompter script is being displayed to the broadcaster using the teleprompter device 115. In such embodiments, the VLA agent 103 processes the text of the teleprompter data 150 to suggest appropriate lighting tasks 131 associated with a segment to an operator of the console 106.

In some embodiments, the VLA agent 103 uses the data stored at the data storage 120 to predict patterns and create mappings between the data. In such embodiments, after the VLA agent 103 obtains the historical data 135, telemetry data 140, and context data 145 over a period of time, the VLA agent 103 determines that certain tasks 131 are executed repetitively based on certain timing conditions or locations. The VLA agent 103 associates the historical data 135, telemetry data 140, and context data 145 for tasks 131 together such that the historical data 135, telemetry data 140, and context data 145 associated with a particular event, location, operator, holiday, or time of day is mapped together.

For example, the VLA agent 103 may create a mapping between the historical data 135 indicating that a certain lighting command 130 focuses the light in the theater seating area at 6:00 PM, the context data 145 indicating that this lighting command 130 is performed Monday through Thursday only, and the telemetry data 140 indicating the positional information and spatial information of the lighting devices 112 used to focus the light in the theater seating area. In some embodiments, the VLA agent 103 may create a mapping between the situational awareness data regarding a particular location at which an event occurs and the tasks 131 that are executed for the event at the particular location. The data storage 120 stores these mappings such that the VLA agent 103 may access these mappings at a later time.

In some embodiments, the VLA agent 103 uses the stored mappings between the historical data 135, telemetry data 140, context data 145, teleprompter data 150 to determine recommendations 111 for a next task 131 that should be performed by the console 106. In such embodiments, the VLA agent 103 sends the recommendations 111 for the next task to the console 106. Either the console 106 or the VLA agent 103 instructs lighting devices 112 to perform the recommended task 131 when the operator accepts the recommendation 111 via a UI 126 of the console 106.

In some embodiments, the VLA agent 103 determines a location of the console 106 and an event being controlled by the console 106 before determining recommendations 111 for a next task 131. A mapping may indicate that geographical situational awareness data maps to an event being controlled by the console 106 at a particular location. In this case, the VLA agent 103 determines recommendations 111 for the next task 131 based on the location of the console 106 and/or the event being controlled by the console 106. For example, when a single show is performed at various different theaters, the VLA agent 103 may automatically determine recommendation 111 for next tasks 131 using the mappings of the geographical situational awareness data. In this example, the VLA agent 103 determines a recommendation 111 for the next task 131 based on a current theater at which the console 106 is located and the event is being performed. As another example, the VLA agent 103 may also automatically determine the language compatible with the console 106 for a theater based on a current theater at which the console 106 is located and the event is being performed.

In some embodiments, the time zone, video standards, frame rates, and/or local legislation restrictions that apply to a particular location as indicated in the geographical situational awareness data may also be used in determining recommendations 111 for a next task 131 based on the appropriate time and day. For example, when geographical situational awareness data indicates that a particular location does not permit above a certain amount of light pollution, the VLA agent 103 will adjust the recommendations 111 for the next task 131 as necessary to account for the local restriction. For example, when geographical situational awareness data indicates that console 106 is located in a particular time zone, VLA agent 103 provides recommendation 111 to adjust the time and date for the console 106 to the correct localised time zone.

For example, suppose that every Wednesday night, the operator typically manually enters the command strings for the command 130 used to light the theater seating area sometime shortly before 6:00 PM. However, when the operator uses the adaptive lighting system 100, the VLA agent 103 automatically predicts a recommendation 111 that the command 130 used to light the theater seating area is likely to be executed by the console 106 around 6:00 PM. In this case, the VLA agent 103 either displays the recommendation 111 on the VLA UX 127 or transmits the recommendation 111 to the console 106 to be displayed using the UI 126. The operator may then accept or decline (reject) the recommendation 111 using the VLA UX 127 or the UI 126. By accepting the recommendation 111, the operator directs the console 106 to control the lighting devices 112 based on the next task 131 included in the recommendation 111. By declining this recommendation 111, the operator instructs the VLA agent 103 to refrain from sending this recommendation 111 in the future. The operator's response to the recommendation 111 is stored as a preference of an operator for a particular event that is being controlled using the console 106. The preference may be stored at the data storage 120 and indicates responses to various recommendations 111 performed by the VLA agent 103. The preference may be stored as specific to the operator and/or specific to the event for which lighting is being controlled.

In some embodiments, the VLA server 109 performs the duties of the VLA agent 103 on behalf of the VLA agent 103 to save resources at the VLA agent 103. For example, the VLA agent 103 still obtains the previous tasks 131 from the console 106, receives the telemetry data 140 from the lighting devices 112, obtains the context data 145, and receives the teleprompter data 150 from the teleprompter device 115. The VLA agent 103 sends the data to the data storage 120 for storage. In some such embodiments, the data storage 120 is located in a remote cloud server instead of locally at the electronic device implementing the VLA agent 103.

The VLA server 109, which has access to the data stored at the data storage 120, determines patterns in historical data 135, and creates mappings between the historical data 135, telemetry data 140, and context data 145. The VLA server 109 determines a recommendation 111 for a next task 131 based on the historical data 135, telemetry data 140, and context data 145. The VLA server 109 transmits the recommendation 111 to the VLA agent 103. When the VLA agent 103 is implemented by the console 106, the recommendation 111 is displayed on the UI 126 to present to the operator of the console 106. When the VLA agent 103 is implemented by an electronic device separate from the console 106 or on the cloud server, the VLA agent 103 stores the recommendation 111 and forwards the recommendation 111 to the console 106.

In some embodiments, the VLA agent 103, or the VLA server 109, is configured to learn different control protocols implemented by different consoles 106, in which the learning occurs over time using natural language processing. In this way, the VLA agent 103 can be implemented at different adaptive lighting systems 100 using consoles 106 manufactured by different manufactures to provide accurate recommendations 111 to an operator regardless of the control protocol implemented by the consoles 106.

For example, the console 106 may be compatible with a particular script syntax. However, different lighting systems 100 may include different consoles 106 manufactured by different manufacturers and operating using different script syntaxes. In some embodiments, the VLA agent 103 learns the syntax of console 106 using natural language processing or other methods of machine learning or artificial intelligence. The VLA agent 103 then learns, understands, and recognizes various different script syntaxes that are compatible with different types of consoles 106. The VLA agent 103 not only learns the syntax, but also learns patterns of commands 130 based on the syntax of the command 130. This can then be utilized to predict actions based on past commands 130. The VLA agent 103 can also recognize a pattern and then provide recommendations 111 for the remainder of the commands 130 based on a recognized pattern. Additionally, the VLA agent 103 may make syntax predictions (e.g., a probability of a next word in the syntax, and a next set of commands).

As an illustrative example, an operator may type a series of commands 130 into console 106, such as: "1 @F Record Enter" then "2@F Record Enter." Based on these first two commands of the sequence (i.e., historical data 135), the VLA agent 103 predicts that the next command will be "3@F Record Enter." The VLA agent 103 then determines that a recommendation 111 for a next command 130 is: "3@F Record Enter," and transmits this recommendation 111 to the console 106. The operator can accept or reject the recommendation 111. By accepting the recommendation 111, the operator directs console 106 to control the lighting devices 112 based on the next command 130. The operator may otherwise decline this recommendation 111 and/or direct the VLA agent 103 not to make this type of prediction or recommendation 111 in the future.

As another example, suppose a lighting rig is shaped in the form of a circle. The operator programs a sequence of lighting effects using the console 106 to provide the effect that a change in the lighting is "chasing" around the circle. That is, the operator directs console 106 to turn all lights off, then light 1 on, then light 2 on, then light 3 on, and so forth. The VLA agent 103 detects this pattern from lighting devices 112. Then, the VLA agent 103 predicts and subsequently provides a recommendation 111 for multiple next commands 130: light 4 on, light 5 on, . . . , light N on, where N is a subsequent number of a lighting device 112 based on the detected pattern.

As yet another example, suppose that the console 106 programs the lighting devices 112 to perform a lighting effect every Monday and Tuesday between 18:30 and 19:00 based on Cue 1. That is, lighting devices 112 may be programmed for a specific protocol (i.e., Cue 1). The VLA agent 103 monitors these parameters, predicts future tasks 131, and subsequently provides a recommendation 111 on Wednesday at 18:29 for the execution of Cue 1. The operator can accept this suggestion or decline this recommendation 111, as mentioned above.

The VLA agent 103 may collate the telemetry data 140 to create a three dimensional (3D) visualization of a quantity and types of lighting devices 112. For example, the VLA agent may control a focus of a lighting device 112 or suggest to focus the lighting device 112 on a specific location of a stage (for performances/theatrical shows). Also, the VLA agent 103 may maintain focus at the positions and light beam sizes based on the telemetry data 140 when venues are changed. For example, a show may be programmed in one venue, and then move to a second venue where the heights of trusses supporting the lighting devices 112 are different. In some embodiments, the VLA agent 103 monitors the telemetry data 140 and in response uses the console 106 to control the lighting devices 112 to maintain the intended focus positions and beam sizes when the show is replayed at the second venue. In some such embodiments, the lighting devices 112 may report GPS coordinates and altitudes to console 106. This allows console 106 to understand a lighting layout and spatial relationships between lighting devices 112 and targets of beams of light emitting from the lighting devices 112.

For example, the VLA agent 103 may detect that a certain subset of the lighting devices 112 are positioned in a circle based on the telemetry data 140. Then, once a programmer starts to program the subset of the lighting devices 112 in a pattern, the VLA agent 103 suggests a recommendation 111 indicating a next command 130. The next command 130 includes a syntax that would provide patterns based on the shape of the circle.

In the television broadcast setting, the VLA agent 103 can adaptively learn a lighting command 130 or a sequence of lighting commands 130 that needs to be cued for playback based on the teleprompter script included in the teleprompter data 150. The teleprompter script contains text that indicates segments or sequences from the show script and a running order of the show. In some embodiments, as the teleprompter script is being displayed at the teleprompter device 115, the VLA agent 103 reads and examines the teleprompter script to identify one or more keywords that signal a particular lighting sequence. For example, the VLA agent 103 performs text recognition on the teleprompter script to determine a keyword associated with a particular sequence, and then determines a cue corresponding to the sequence. The VLA agent 103 generates a recommendation 111 for the cue corresponding to the sequence identified based on the teleprompter script and sends the recommendation 111 to the console 106. The recommendation 111 may also include lighting control commands 130 related to the sequence identified based on the teleprompter script. The operator may decide whether to accept or decline the recommendation 111, and a preference may be stored according to the operator's decision.

For example, when a teleprompter script contains the text "Sequence 10," the VLA agent 103 processes the text and determines that "Sequence 10" corresponds to a show segment. The VLA agent 103 predicts the show segment and generates a recommendation 111 suggesting the execution of a particular cue or sequence by the lighting devices 112 programmed for matching the show segment with lighting data appropriate for "Sequence 10." The operator may accept or decline this recommendation 111.

The embodiments disclosed herein are advantageous in that the operator of the console 106 does not need to continuously enter command strings corresponding to various tasks 131 into the console 106. Instead, after the VLA agent 103 has learned patterns performed by the console 106, the operator can instead, on occasion, simply accept or reject recommendations 111 suggested by the VLA agent 103. This allows for the operator to have more time and resources available to perform other significant tasks for the event being controlled or to dynamically add more unique special effects or lighting features to the event. Therefore, the embodiments disclosed herein enable a more efficient manner in which to control lighting devices 112 via a console 106. The embodiments disclosed herein also enable a more accurate and consistent way of operating the lighting devices 112 for an event. The VLA agent 103 presents the recommendations 111 consistently at the time they are needed, thereby eliminating human error that may occur when an operator is reading commands 130 from notes stored on paper or a device, or mentally recalling commands 130 to be performed at a certain time.

The embodiments disclosed herein, performed by the VLA agent 103, are necessarily rooted in computer technology to overcome the problems arising when programming tasks 131 using a console 106 to control lighting devices 112 in an adaptive lighting system 100, where the adaptive lighting system 100 comprises a computer network. The embodiments disclosed herein also provide a practical application to adaptive lighting systems 100 used in the entertainment industry and controlled by an operator using a console 106. For example, the VLA agent 103 improves the functioning of the console 106 by increasing the speed or efficiency with which a user can enter command strings into a command line at the console 106. The VLA agent 103 also improves the functioning of the adaptive lighting system 100 to increase the accuracy of timing and positioning of the lighting devices 112 within a lighting rig. The embodiments disclosed herein also improve the functioning of television broadcasting systems by executing cues based on a live teleprompter script instead of a manually selected cue. For example, the correct cue can be executed by the audio/video devices 113 based on keywords identified in the teleprompter script in case the segment order changes abruptly during a live broadcast.

For some lighting devices 112, the order and structure of the command line syntax may be as follows: [{Source}] {Mask} Command [{Options}] Destination:

Source: The source is the object within the show that data is taken from. The source may include a palette, scene, cue, or editable editor. With most commands 130, the source object is not modified.

Mask: The mask is a filter for filtering some of the data from the source object. There are two types of masks: a fixture mask specifies only data for certain devices/fixtures (for example ABClight 1); a kind mask specifies only data for certain kinds (for example Color, Beam). If no mask is specified then the entire contents of the current active editor are included in the command.

Command: The command 130 is the operation to be performed. Commands 130 include Copy, Record, Delete, Move, Merge, Knockout. Some of these only need a source to be specified, others only need a destination, but they all have the same syntactical form.

Options: The behavior of some commands 130 (for example Record) can be altered with options. These usually appear on a pop-up toolbar once the command key is pressed.

Destination: The destination is the object that will be affected by the command 130. Again, it may be a palette, cue, scene or the editable editor. If the destination already exists, and the action to take is unclear, then a question is created asking what console 106 should do.

Some examples of command line syntax are shown below in Table 1. Note that a final press of the Enter key is required to notify console 106 that the command 130 is complete and ready to be executed. In Table 1 below, the terms Position, Group, Cue, Copy, Record, and Replace indicate static control oriented objects and commands. The numbers indicate dynamic elements representing lighting control parameters and lighting device parameters described previously.

cal (OE) components coupled to the ports 220 and Tx/Rx 210 for receiving and transmitting electrical signals and optical signals.

The processor 230 may be implemented by hardware and software. The processor 230 may be implemented as one or more central processing units (CPUs) and/or graphics processing unit (GPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 233. The recommendations module 224 is implemented by the processor 230 to execute the instructions for implementing various embodiments discussed herein. For example, the recommendations module 224 is configured to determine recommendations 111 for a next task 131 based on the fixture library 155 and at least one of the historical data 135, telemetry data 140, and context data 145. The inclusion of the recommendations module 224 provides an improvement to the functionality of the VLA agent 103. The recommen-

TABLE 1

Static control oriented objects and commands, and dynamic elements representing lighting control parameters and lighting device parameters.

| Source | Mask | Command | Options | Destination | Comments |
|---|---|---|---|---|---|
| | | Record | | Position 1 | Records a position palette to location 1 in the position palette directory. No source is given, so the content of the current editor is assumed. |
| | | Record | Replace | Position 1 | The Replace option (on the Record Options Toolbar) ensures that the new palette replaces the previously recorded palette. |
| Position1 | | Copy | | Position 2 | The Copy command takes the Position 1 palette as its source. |
| Position1 | | Copy | Replace | Position 2 | This example combines using a source and a record option. |
| Group 2 | | Record | | Position 3 | Here Group 2 acts as a mask for the record command, so that only fixtures in Group 2 are recorded into the Position 3 palette. |
| Cue1Group3 | Position | Copy | | Cue 5 | Here the parameter values of fixtures in Group 3 are copied from Cue 1 to Cue 5. The Position option applied to the copy command means that only position parameters are included. |

As shown in Table 1, a task 131 represents a sequence of commands 130 to accomplish a particular programming objective, and may include only a single command 130. The adaptive lighting system 100 is configured to detect a "pattern" of commands 130 and parameters, and if detected, predict the remaining tasks 131 required to complete the task 131.

Figure 2:
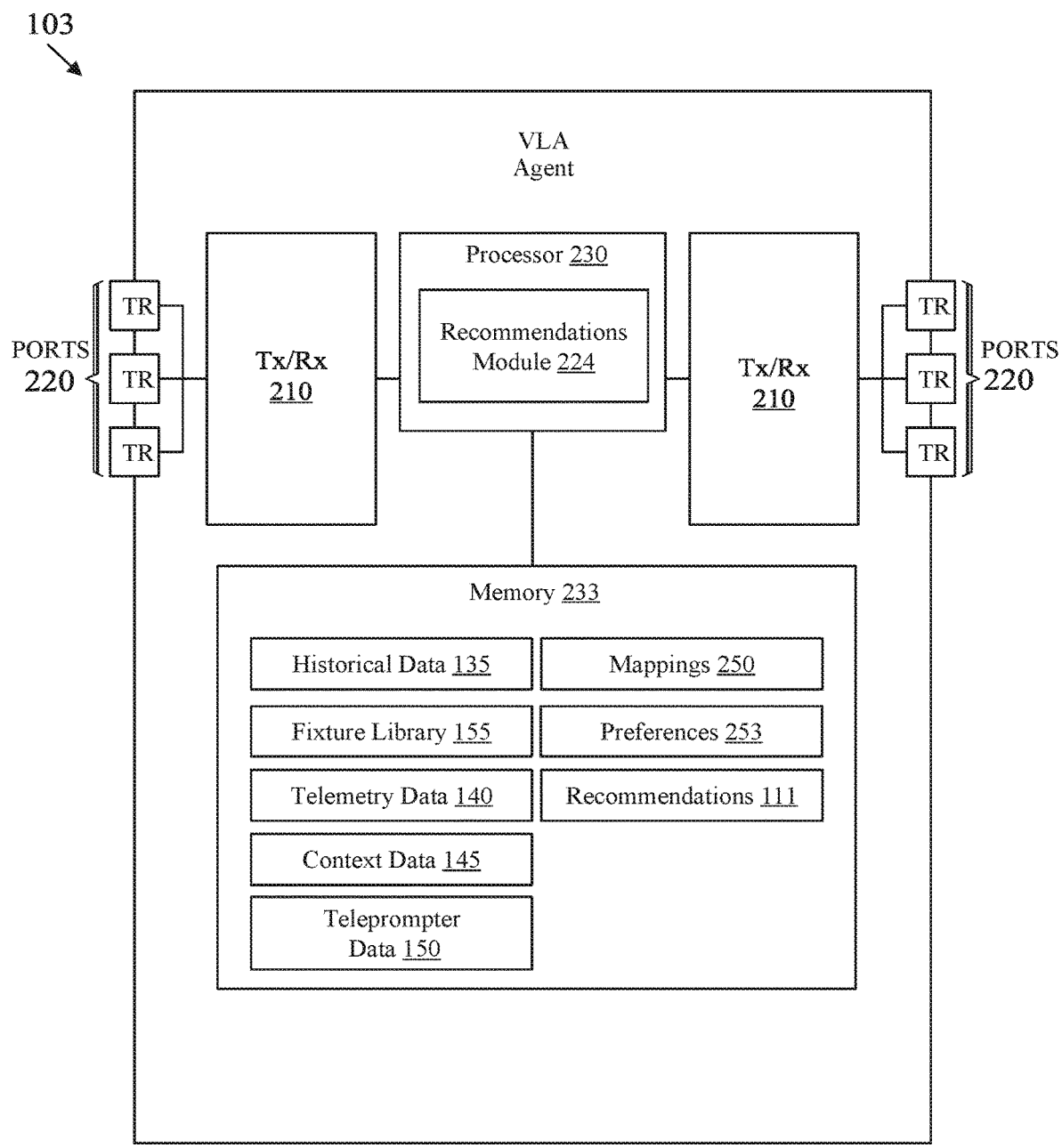
FIG. 2 is a schematic diagram of a VLA agent in accordance with an embodiment of the disclosure.

FIG. 2 is a schematic diagram of VLA agent 103 suitable for generating recommendations 111 according to various embodiments of the disclosure. In an embodiment, the VLA agent 103 may be implemented in the console 106, an electronic device separate from the console 106, or a remote cloud server.

The VLA agent 103 comprises ports 220, transceiver units (Tx/Rx) 210, a processor 230, and a memory 233. The processor 230 comprises a recommendations module 224. Ports 220 are coupled to Tx/Rx 210, which may be transmitters, receivers, or combinations thereof. The Tx/Rx 210 may transmit and receive data via the ports 220. Processor 230 is configured to process data. Memory 233 is configured to store data and instructions for implementing embodiments described herein. The VLA agent 103 may also comprise electrical-to-optical (EO) components and optical-to-electridations module 224 also effects a transformation of VLA agent 103 to a different state. Alternatively, the recommendations module 224 is implemented as instructions stored in the memory 233.

The memory 233 comprises one or more of disks, tape drives, or solid-state drives and may be used as an over-flow data storage device, to store programs when such programs are selected for execution, and to store instructions and data that are read during program execution. The memory 233 may be volatile and non-volatile and may be read-only memory (ROM), random-access memory (RAM), ternary content-addressable memory (TCAM), and static random-access memory (SRAM).

In various embodiments, the memory 233 is configured to store the recommendations 111, historical data 135, fixture library 155, telemetry data 140, context data 145, teleprompter data 150, mappings 250, and preferences 253. The mappings 250 refer to associations between the historical data 135, telemetry data 140, and context data 145 for tasks 131 associated with a particular event. The VLA agent 103 determines the mappings 250 based on the historical data 135, telemetry data 140, and context data 145 for tasks 131 by identifying repetitive patterns occurring in the historical data 135, telemetry data 140, and context data 145 during execution of tasks 131. The preferences 253 store the preference of an operator in response to a recommendation 111 provided to the operator. For example, the preferences 253 stores data regarding whether an operator accepted a recommendation 111 or rejected a recommendation 111.

It is understood that by programming and/or loading executable instructions onto the VLA agent 103, at least one of the processor 230 and/or memory 233 are changed, transforming the VLA agent 103 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often, a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
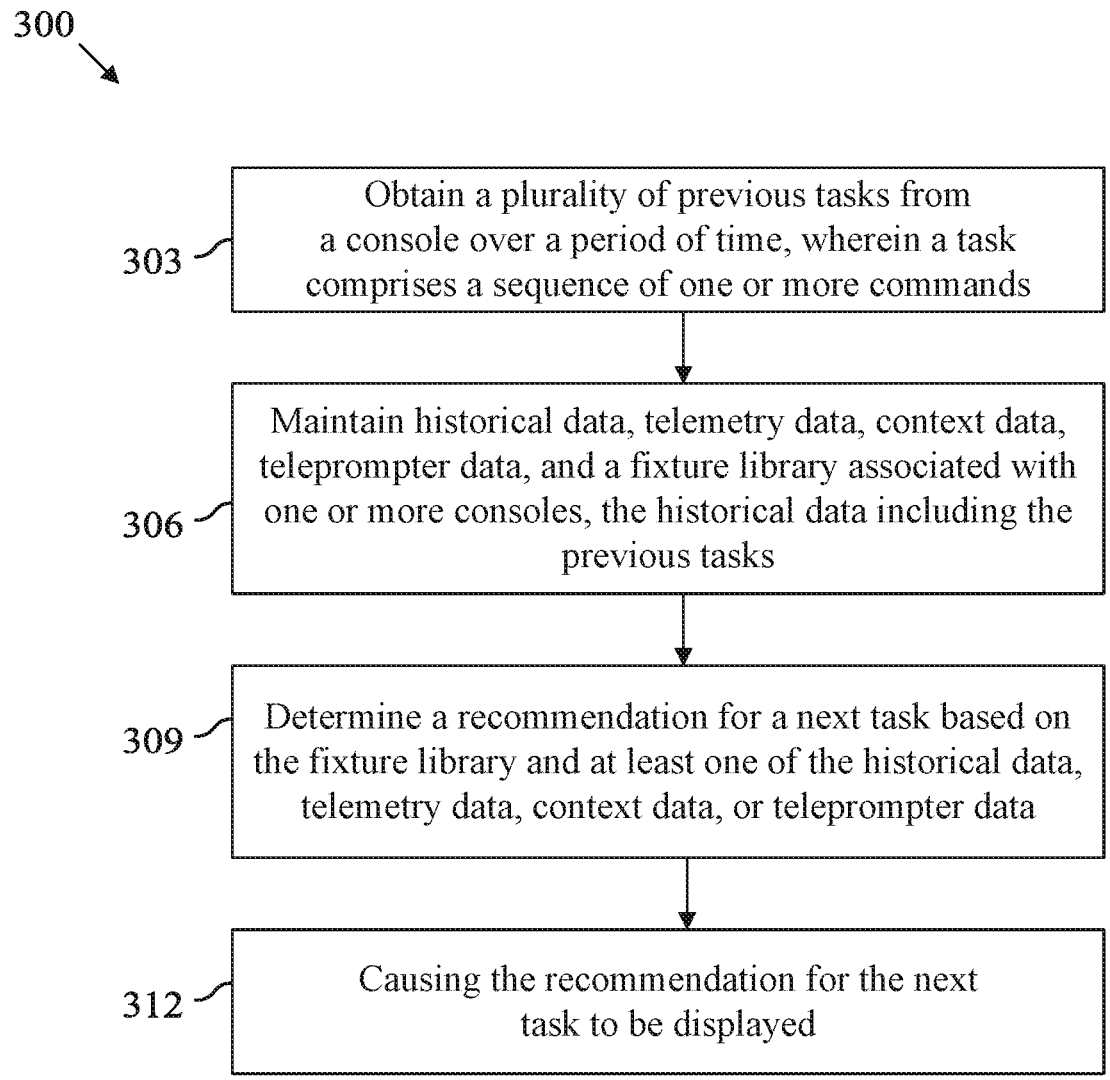
FIG. 3 illustrates a method implemented by a VLA agent for providing recommendations to an operator of the adaptive lighting system in accordance with an embodiment of the disclosure.

FIG. 3 illustrates a method 300 implemented by a VLA agent 103 to provide recommendations 111 to an operator of the adaptive lighting system 100 in accordance with an embodiment of the disclosure. Method 300 is performed by the VLA agent 103, which may be implemented as part of the console 106, the VLA server 109, an electronic device separate from the console 106, or on a remote cloud server. Method 300 is performed after the VLA agent 103 begins to monitor tasks 131 being executed by the console 106 of an adaptive lighting system 100.

At step 303, the VLA agent 103 obtains previous tasks 131 from a console 106 over a period of time. In some embodiments, the VLA agent 103 monitors previous tasks 131 performed by the console 106 over the period of time. For example, the VLA agent 103 may listen, monitor, or receive keystrokes entered into the command line of the console 106 to determine the tasks 131 that are being executed by the console 106 to control the lighting devices 112. In an embodiment in which the VLA agent 103 is implemented by an electronic device separate from the console 106, the VLA agent 103 may receive the previous tasks 131 from the console 106. In other embodiments, the VLA agent 103 receives the previous tasks 131 from an external database or other external entity.

At step 306, the VLA agent 103 maintains the historical data 135, the telemetry data 140, the context data 145, the teleprompter data 150, and the fixture library 155 associated with one or more consoles 106. The historical data 135, the telemetry data 140, the context data 145, the teleprompter data 150, and the fixture library 155 are stored at the data storage 120, which may be located at the console 106, the electronic device implemented as the VLA agent 103, the VLA server 109, or a remote cloud server. The data storage 120 is similar to memory 233 of FIG. 2. The previous tasks 131 that were obtained at step 306 are stored as part of the historical data 135. The historical data 135 includes timing data indicating a time or time period during which the previous tasks 131 were executed, and the VLA agent 103 uses the timing data to determine a repetitive nature of the tasks 131. The time period refers to a sufficient period of time for the VLA agent 103 to make a reasonably accurate determination for a next task 131.

At step 309, the VLA agent 103 determines a recommendation 111 for a next task 131 based on the fixture library 155 and at least one of the historical data 135, the telemetry data 140, context data 145, or teleprompter data 150. The fixture library 155 indicates how to encode the next command 130 of the task 131, which is based on a syntax that is compatible with the console 106 to which the recommendation 111 is being forwarded. The VLA agent 103 uses the telemetry data 140, context data 145, or teleprompter data 150 to identify patterns of tasks 131 and other positional or spatial data that is used to determine the recommendation 111.

At step 312, the VLA agent 103 causes the recommendation 111 for the next task 131 to be displayed to the operator of the console 106. In the embodiment in which the VLA agent 103 is implemented as part of the console 106, the VLA agent 103 displays the recommendation 111 on the display 124 in a UI 126 of the console 106. In the embodiment in which the VLA agent 103 is implemented on an electronic device or remote cloud server separate from the console 106, the VLA agent 103 transmits the recommendation 111 to the console 106 or any other device accessible to the operator. The other device includes a display and a UI by which the operator can select whether to accept or reject the recommendation 111.

The operator's subsequent response to the displayed recommendation 111 is stored in the preferences 253. For example, if the operator selects a button (or other control) on the UI 126 to reject the recommendation 111, the VLA agent 103 receives an indication of the rejection, and saves the rejection in the preferences 253 of the operator and/or the event associated with the recommendation 111. In contrast, if the operator selects the button on the UI 126 to accept the recommendation 111, the VLA agent 103 receives an indication of the acceptance, and saves the acceptance in the preferences 253 of the operator and/or the event associated with the recommendation 111.

Figure 4:
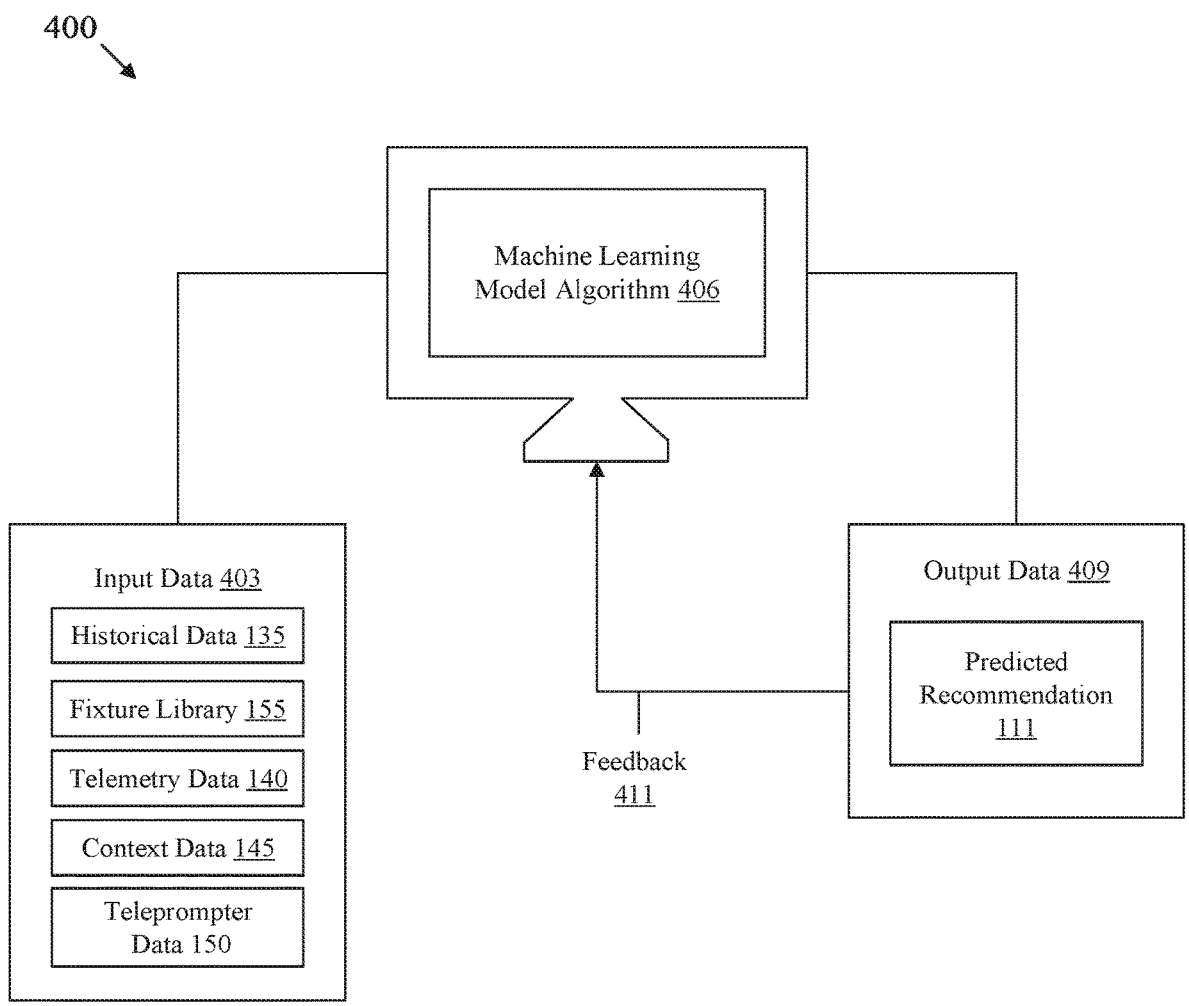
FIG. 4 illustrates an operation of a machine learning model implemented by the VLA agent in accordance with an embodiment of the disclosure.

FIG. 4 illustrates an operation of a machine learning model 400 implemented by the VLA agent 103 in accordance with an embodiment of the disclosure. Machine learning is an application of artificial intelligence (AI) that provides systems with the ability to automatically learn and improve from experience without being explicitly programmed. The machine learning model 400 refers to a model of data processing and analysis that is used to determine recommendations 111.

The machine learning model 400 illustrates that a set of input data 403 is provided to the machine learning model algorithm 406 to determine a set of output data 409. In the embodiments disclosed herein, the input data 403 includes the historical data 135, fixture library 155, telemetry data 140, context data 145, teleprompter data 150, and/or any other parameters or data that may be used to identify a pattern of tasks 131 and a recommendation 111 for a next task 131 based on the identified pattern. The set of input data 403 is fed into a machine learning model algorithm 406 to result in the set of output data 409. The set of output data 409 includes the predicted recommendation 111 for the next task 131.

The machine learning model algorithm 406 refers to an equation that is continuously trained using training data, such as the set of input data 403, until the machine learning algorithm 406 results in output data 409 having recommendations 111 that are reasonably accurate or above a threshold of accuracy. The machine learning model algorithm 406 may refer to any type of machine learning algorithm, such as, for example, natural language processing. Natural language processing is a field of machine learning associated with understanding, analyzing, and manipulating text to predict new text and generate new language. The machine learning model algorithm 406 may otherwise refer to any other type of machine learning algorithm, such as supervised learning, regression, decision tree, KNN, deep learning model algorithms, neural network model algorithms, recurrent neural network model algorithms, etc.

In some cases, the machine learning model algorithm 406 is an equation that is computed using the input data 403 to result in the set of output data 409 and feedback 411. The feedback 411 indicates an accuracy of the resulting output data 409 and is fed back to the machine learning model algorithm 406. The accuracy of the resulting output data 409 may be determined based on a verification process. In some embodiments, the machine learning model 400 may verify whether resulting output data 409 matches, or substantially matches, the actual next task 131 that is performed by the console 106. During the process of training the machine learning model 400, input data 403 for which the matching output data 409 is already known may be input into the machine learning model algorithm 406. The resulting output data 409 may be compared with the matching output data 409 to determine feedback data 411, where the feedback data 411 indicates a result of the comparison between the resulting output data 409 and the matching output data 409. In some embodiments, the preferences 253 received by the operator in response to a recommendation 111 provided to the operator can also be used to verify whether resulting output data 409 matches, or substantially matches, the actual next task 131 that is performed by the console 106. For example, the feedback data 411 may indicate whether the operator accepted the recommendation 111 or whether the operated rejected the recommendation 111. The machine learning model algorithm 406 can adjust one or more weights used for the equation, for example, as vectors, based on the feedback 411 to fine tune and improve the machine learning model algorithm 406 to result in more accurate output data 409.

In this manner, the more input data 403 that is fed into the machine learning model algorithm 406 during the training process, the more accurate the output data 409 is likely to be because each time the machine learning model algorithm 406 runs, the feedback 411 is used to further correct the machine learning model algorithm 406. In the embodiments disclosed herein, the more historical data 135, fixture library 155, telemetry data 140, context data 145, teleprompter data 150, and/or other parameters or data that is fed into the machine learning model algorithm 406, the more accurate the predicted recommendations 111. The more accurate the predicted recommendations 111, the more efficiently the adaptive lighting system 100 begins to execute for a given event or show.

Figure 5:
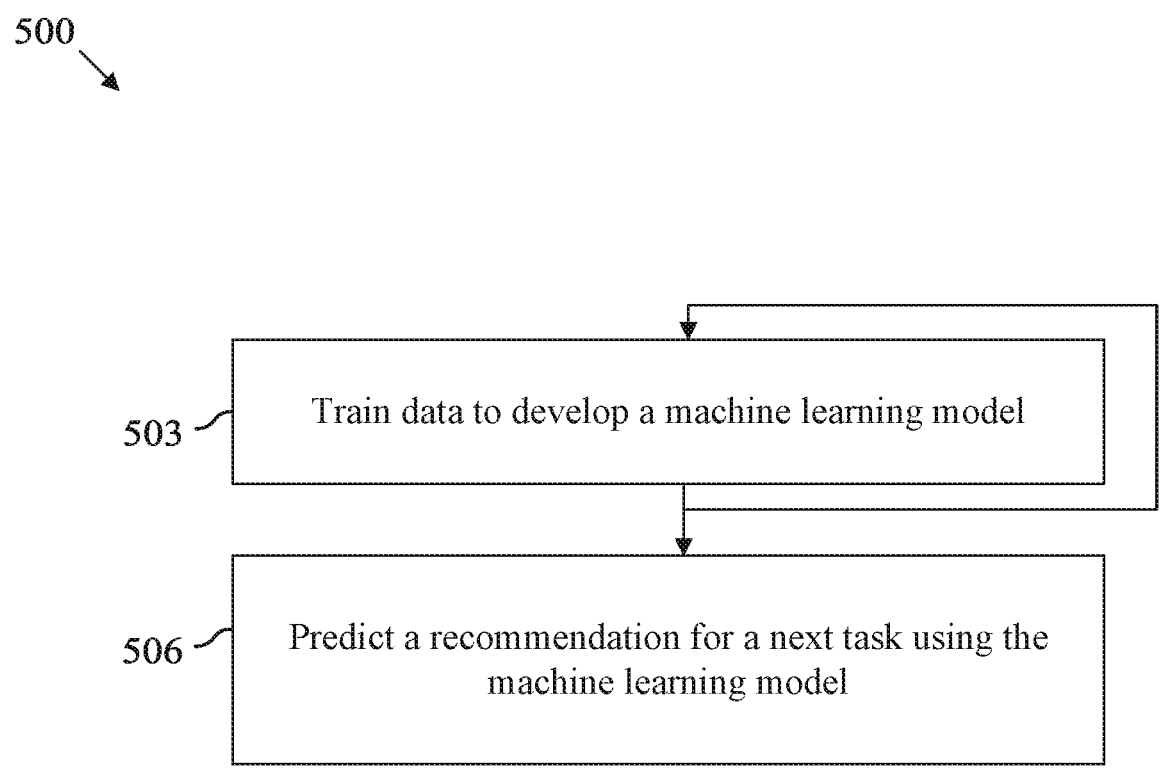
FIG. 5 illustrates a method implemented by a VLA agent to continuously learn and analyze more data to improve the methods for providing recommendations to an operator of the adaptive lighting system in accordance with an embodiment of the disclosure.

FIG. 5 illustrates a method 500 implemented by a VLA agent 103 to continuously learn and analyze data to improve the methods for providing recommendations 111 to an operator of the adaptive lighting system 100 in accordance with an embodiment of the disclosure. Method 500 is implemented by the VLA agent 103 as the VLA agent 103 obtains tasks 131, historical data 135, telemetry data 140, context data 145, and teleprompter data 150.

At step 503, the VLA agent 103 is configured to train data, such as the input data 403, to develop the machine learning model 400. Step 503 is performed in a manner similar to that as described above with respect to the machine learning model 400 of FIG. 4. As described above with reference to FIG. 4, a set of input data 403 is provided to the machine learning model algorithm 406 to determine a set of output data 409. In the embodiments disclosed herein, the input data 403 includes the historical data 135, fixture library 155, telemetry data 140, context data 145, teleprompter data 150, and/or any other parameters or data that may be used to identify a pattern of tasks 131 and a recommendation 111 for a next task 131 based on the identified pattern.

Machine learning processes can be very computing and resource intensive. As such, step 503 may be performed by VLA server 109 or a remote cloud server, and the input data 403 may be used to train the machine learning model at the VLA server 109 or the remote cloud server. During the training process, the historical data 135, telemetry data 140, context data 145, teleprompter data 150, and/or fixture library 155 may be factored into the machine learning model 400 by way of vectors or weights incorporated into the equation corresponding to the machine learning model algorithm 406. In an embodiment, the machine learning model 400 may be continuously fed with input data 403 until the machine learning model algorithm 406 consistently results in accurate output data 409 (e.g., recommendations 111) for a threshold period of time. After the training of the machine learning model 400 is complete, feedback 411 need not be input back into the machine learning model algorithm 406. In some embodiments, the training process may be entirely performed by a more powerful machine, such as a cloud server, such that the completely trained machine learning model 400 can be transmitted to a less powerful and more economical device. For example, the VLA server 109 may receive machine learning model 409 from a cloud server after the cloud server has completed training of the machine learning model 400.

At step 506, the VLA agent 103 predicts a recommendation 111 for a next task 311 using the machine learning model 400 after the machine learning model 400 has been trained to a sufficient level. In an embodiment, additional input data 403 is used as variables in the machine learning model algorithm 406 to result in the output data 409 (e.g., recommendations 111).

Figure 6:
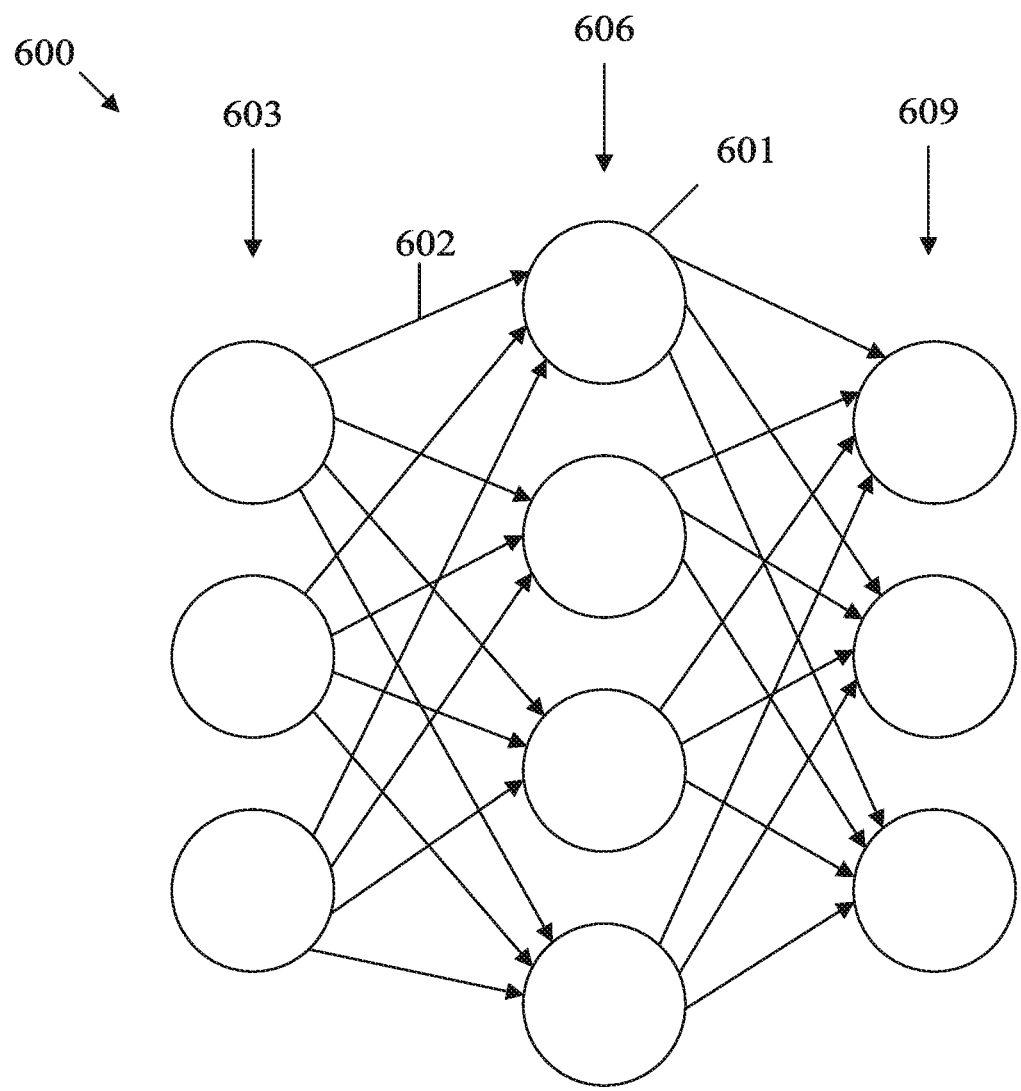
FIG. 6 is a diagram of a neural network used to implement the machine learning model of FIG. 4 in accordance with an embodiment of the disclosure.

FIG. 6 is a diagram of a neural network 600 used to implement the machine learning model 400 in accordance with an embodiment of the disclosure. In particular, the neural network 600 is a deep neural network including an interconnected group of nodes, inspired by a simplification of neurons in a brain. As shown, each circular node 601 represents an artificial neuron and arrows 602 represent connections from an output of one artificial neuron to an input of another.

The deep neural network 600 includes input layer 603, hidden layers 606, and output layer 609. Traditional neural networks 600 only contain 2-3 hidden layers 606, while deep neural networks can have as many as 150 hidden layers 606. Deep learning models are trained using large sets of labeled data and neural network architectures that learn features directly from the data without the need for manual feature extraction.

Figure 7A:
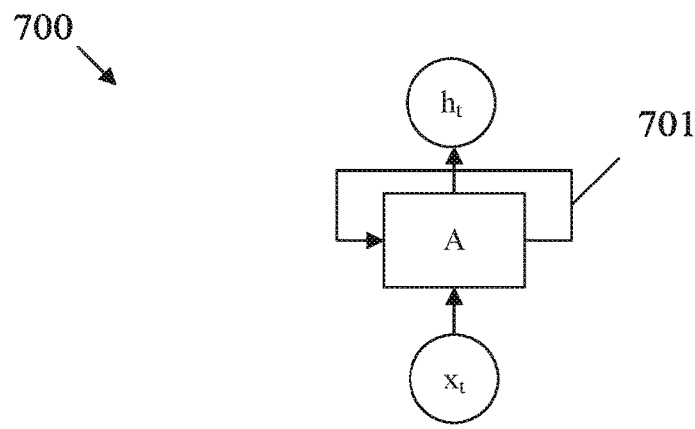
FIGS. 7A-B are diagrams of a recurrent neural network (RNN) used to implement the machine learning model of FIG. 4 in accordance with an embodiment of the disclosure.

FIG. 7A is a diagram of a RNN 700 (recurrent neural network) used to implement the machine learning model 400 in accordance with an embodiment of the disclosure. RNNs 700 use previous data to determine next using loops, which allows information to persist. As shown by FIG. 7A, RNN 700 includes a loop 701. A chunk of neural network A looks at some input x at time t and outputs a value h and time t. Loop 701 allows information to be passed from one step of the RNN 700 to the next. RNN 700 can be thought of as multiple copies of the same network, each passing a message to a successor.

Figure 7B:
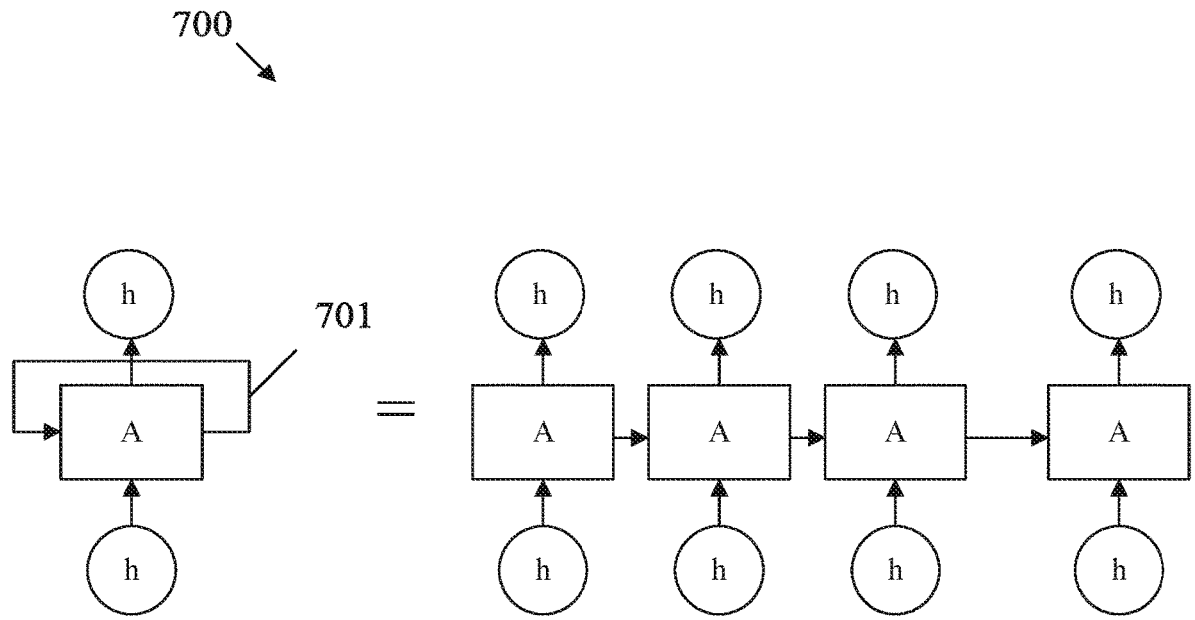

FIG. 7B illustrates the unrolling of the loop 701 in RNN 700. RNN 700 exhibits a chain structure that is related to sequences and lists. The RNN 700 may be implemented as at least one of a Language Model, a Sequence to Sequence Model, an Attention Model, and an Encoder-Decoder Model.

Language Models

A language model takes in a sequence of inputs, looks at each element of the sequence and tries to predict the next element of the sequence. The following equation describes this process:

$$Y_t = f(Y_{t-1}) \quad (1)$$

Where $Y_t$ is the sequence element at time t, $Y_{t-1}$ is the sequence element at the prior time step, and $f$ is a function mapping the previous element of the sequence to the next element of the sequence. The function $f$ represents a neural network which predicts the next element of a sequence given the current element of the sequence. Language models are generative, in that once the language models are trained, they can be used to generate sequences of information by feeding their previous outputs back into the model.

Figure 8:
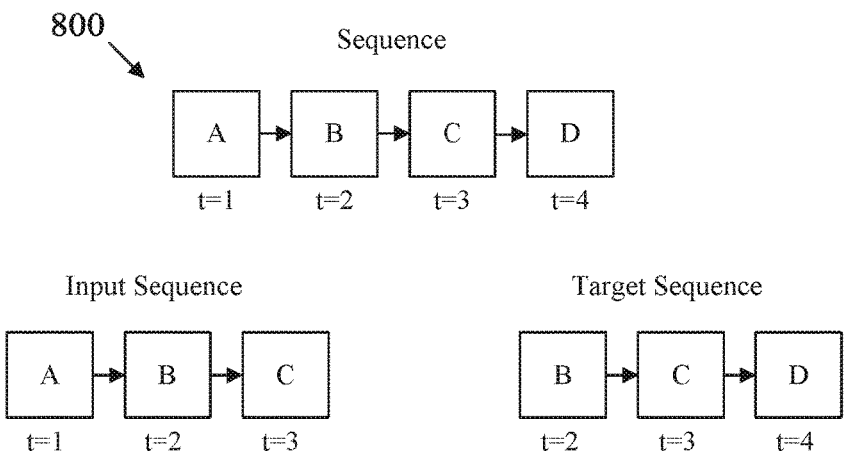
FIGS. 8, 9A-B, and 10 illustrate the training and generation process of a machine learning model implemented as a language model in accordance with an embodiment of the disclosure.

The machine learning model 400 implemented by the VLA agent 103 may be such a language model that takes in the historical data 135, fixture library 155, telemetry data 140, context data 145, teleprompter data 150, and/or any other suitable parameters. The machine learning model 400 predicts the next task 131 based on the language model FIGS. 8-10 illustrate the training and generation process of the machine learning model 400 implemented as a language model 800 in according with an embodiment of the disclosure. In particular, FIG. 8 illustrates a sequence {ABCD}. The input sequence is a slice of the whole sequence up to the last element {ABC}. The target sequence is a slice of the whole sequence starting from t=2 {BCD}.

Figures 9A, 9B:
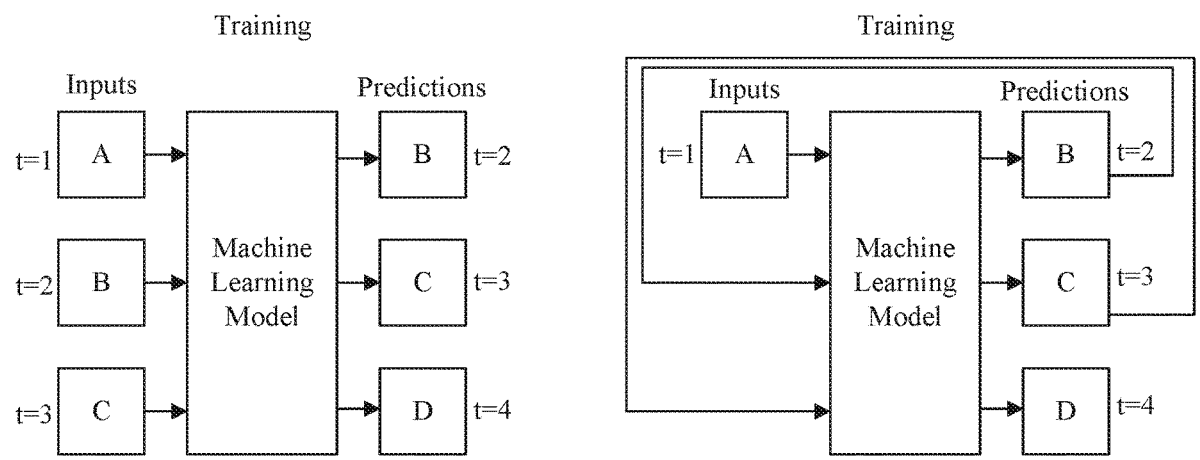
Figure 10:
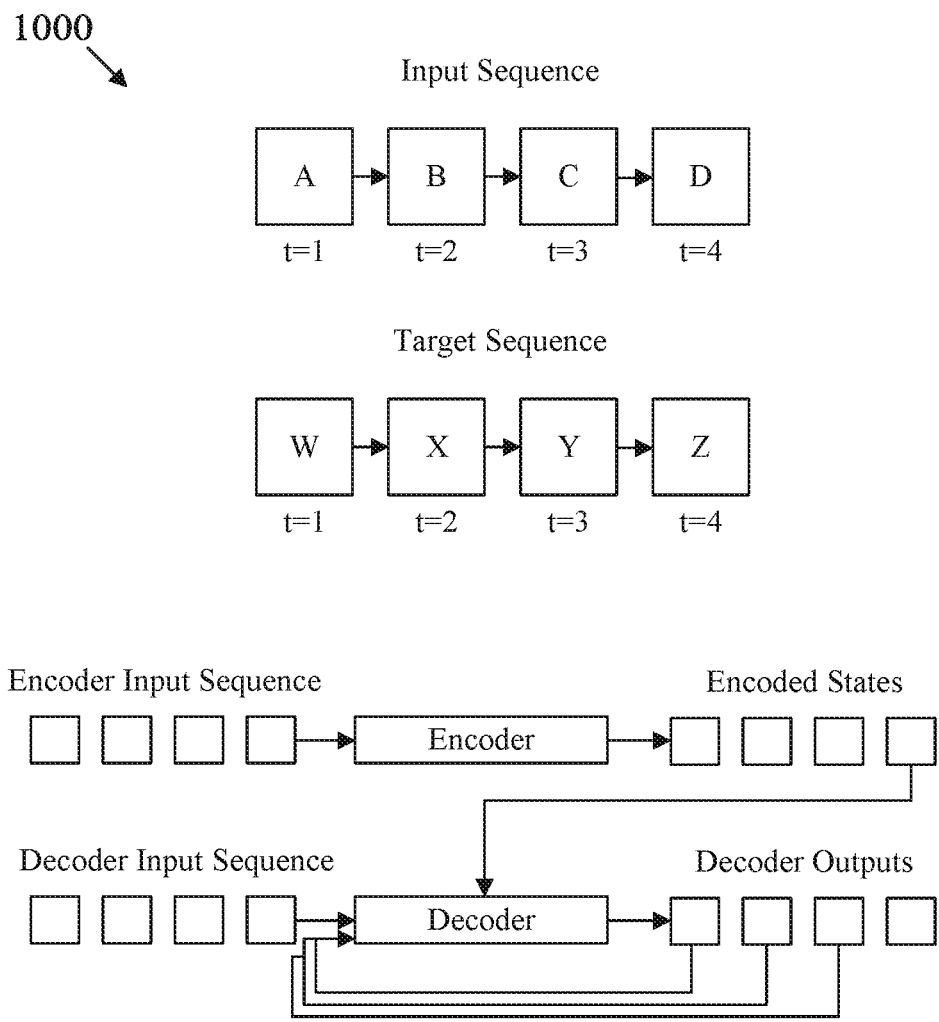

FIG. 9A illustrates that during training, the language model 800 tries to predict the next element of the target sequence given the current element of the target sequence. FIG. 9B illustrates that during generation, the language model 800 passes the result of a single prediction. RNNs 700 are similar to standard neural networks, but they operate on sequences of data. Basic RNNs 700 take each element of a sequence, multiply the element by a matrix, and then sum the result with the previous output from the RNN 700. This is described by the following equation:

$$h_1 = \text{activation}(X_t W_x + h_{t-1} W_h) \quad (2)$$

Sequence to Sequence Models

Sequence to sequence models build on top of language models by adding an encoder step and a decoder step. In the encoder step, a model converts an input sequence (such as an English sentence) into a fixed representation. In the decoder step, a language model is trained on both the output sequence (such as the translated sentence) as well as the fixed representation from the encoder. Since the decoder model sees an encoded representation of the input sequence as well as the translation sequence, more intelligent predictions may be made about future words based on the current word.

For example, in a standard language model, there may be the word "crane" and the model may not be sure if the next word should be about the bird or heavy machinery. However, if there is an encoder context, the decoder might realize that the input sequence was about construction, not flying animals. Given the context, the decoder can choose the appropriate next word and provide more accurate translations.

The RNN 700 processes the input sequence, and then the RNN 700 passes its final output to the decoder sequence as a context variable. The decoder is also a RNN 700. A function of the decoder is to examine the translated input sequence, and then try to predict the next word in the decoder sequence—given the current word in the decoder sequence, as well as the context from the encoder sequence. After training/learning, the decoder produces translations by encoding the sentence desired to be translated and then running the network in generation mode. FIG. 10 illustrates a sequence to sequence model 1000, in which the encoder outputs a sequence of states. The decoder is a language model with an additional parameter for the last state of the encoder.

Attention Models

Recent research has shown that the same processes that allow humans to focus on important information while filtering out unnecessary data can be applied to neural networks. This technique, commonly referred to as "attention," helps build neural networks that can effectively tackle challenging sequence processing tasks, such as language translation, where simple sequence to sequence models fail. Attention models build on top of sequence to sequence models by adding an attention computer to condition the inputs to the decoder step.

The sequence to sequence model 1000 provides for processing of input and output sequences. However, compressing an entire input sequence into a single fixed vector tends to be quite challenging. Moreover, the last state of the encoder contains mostly information from the last element of the encoder sequence. Therefore, the context is biased towards the end of the encoder sequence, and might miss important information at the start of the sequence.

Instead of compressing the entire input sequence into a fixed representation, an attention mechanism can be utilized. The input sequence is encoded with an RNN 700. This mechanism holds onto all states from the encoder and gives the decoder a weighted average of the encoder states for each element of the decoder sequence. Now, the decoder takes "glimpses" into the encoder sequence to figure out which element it should output next.

During the decoding phase, the state of the decoder network is combined with the encoder states, and this combination is passed to a feedforward network. The feedforward network returns weights for each encoder state. The encoder inputs are multiplied by these weights and then a weighted average of the encoder states is computed. This resulting context is then passed to the decoder network. The decoder network can now use different portions of the encoder sequence as context while the decoder network is processing the decoder sequence, instead of using a single fixed representation of the input sequence. This allows the decoder network to focus on the most important parts of the input sequence instead of the whole input sequence, therefore producing smarter predictions for the next word in the decoder sequence.

Figure 11:
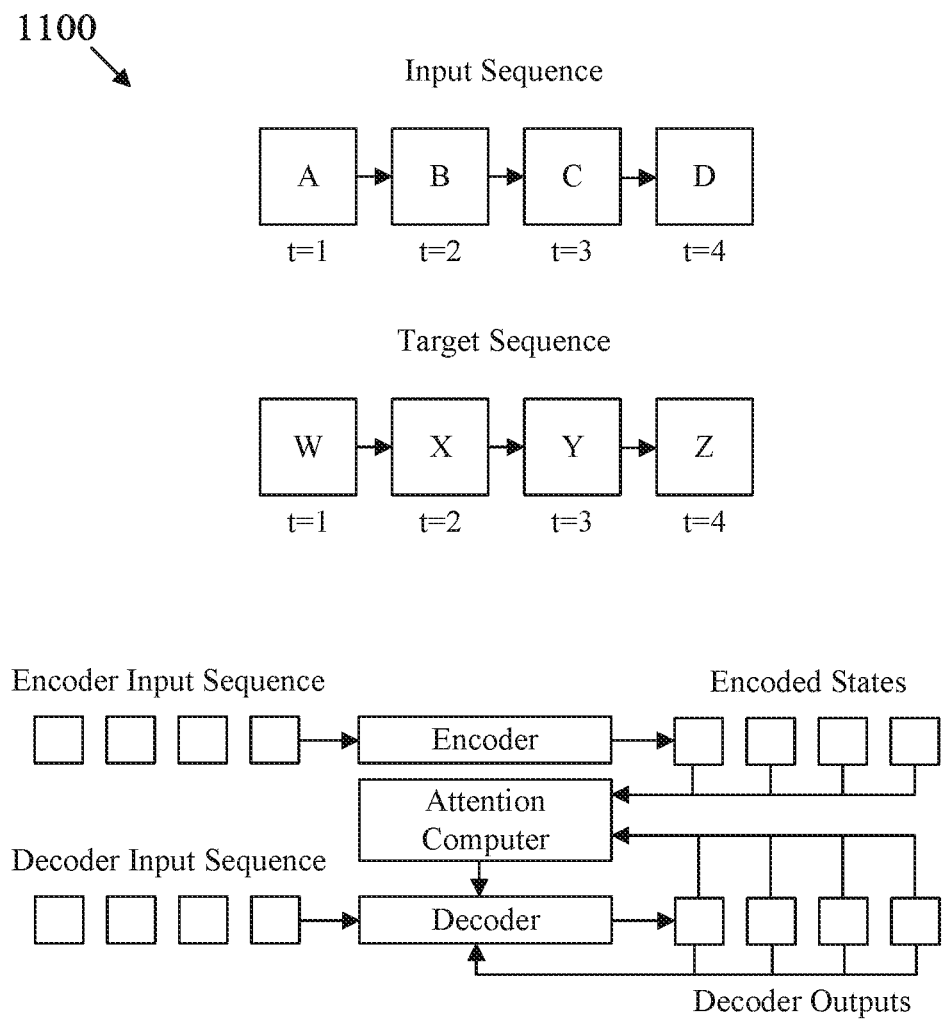
FIG. 11 illustrates a sequence to sequence model that uses attention during training and generation of the machine learning model in accordance with an embodiment of the disclosure.

FIG. 11 illustrates an attention model 1100 that uses attention during training and generation of the machine learning model 400 in accordance with an embodiment of the disclosure. Instead of receiving the last state of the encoder, the attention model 1100 uses an attention computer which returns a weighted average of the encoder states.

Encoder-Decoder Models

Encoder-Decoder Models for RNNs 700 will be understood by one having skill in the art. The neural network architecture learns to encode a variable-length sequence into a fixed-length vector representation and to decode a given fixed-length vector representation back into a variable-length sequence. For example, one having skill in the art understands techniques/models to address the sequence-to-sequence nature of machine translation where input sequences differ in length from output sequences.

Figure 12:
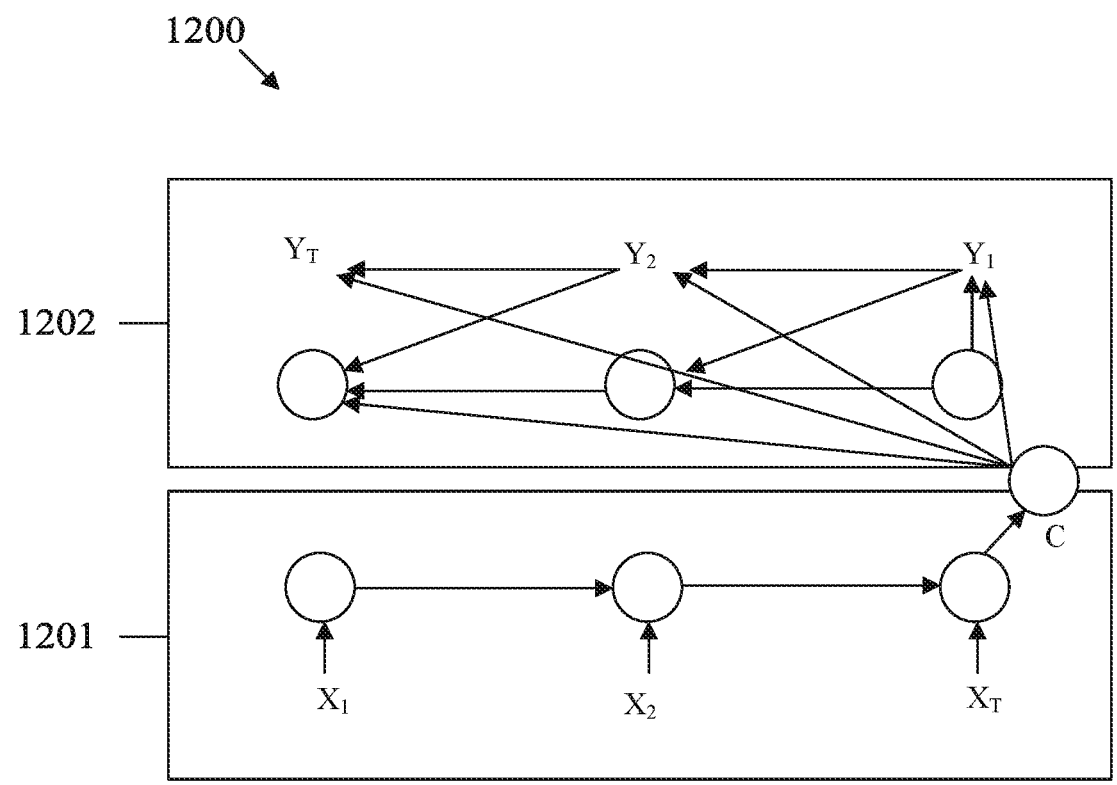
FIG. 12 illustrates the encoder and decoder used by an RNN in accordance with an embodiment of the disclosure.

FIG. 12 illustrates encoder 1201 and decoder 1202 used by an RNN 1200 in accordance with an embodiment of the disclosure. One or both of the encoder 1201 and the decoder 1202 may be used in the sequence to sequence model 1000 of FIG. 10 or the attention model 1100 of FIG. 11. Encoder 1201 steps through the input time steps (1, 2, . . . T) and encodes the entire sequence into a fixed length vector called a context vector (indicated by reference character "C"). Decoder 1202 steps through the output time steps (1, 2, . . . T) while reading from the context vector C. The entire model, including encoder 1201 and decoder 1202, are trained end-to-end, as opposed to training the elements separately. The model is described generically such that different specific RNN 1200 models could be used as encoder 1201 and decoder 1202. Instead of using the popular Long Short-Term Memory (LSTM) RNN, a simple type of RNN, also known as a Gated Recurrent Unit, or GRU, can be utilized.

Further, unlike some models, the output of decoder 1202 from the previous time step is fed as an input to decoding the next output time step. As shown in FIG. 12, output $Y_2$ uses the context vector C, the hidden state passed from decoding $Y_1$ as well as the output $Y_1$.

Figure 13:
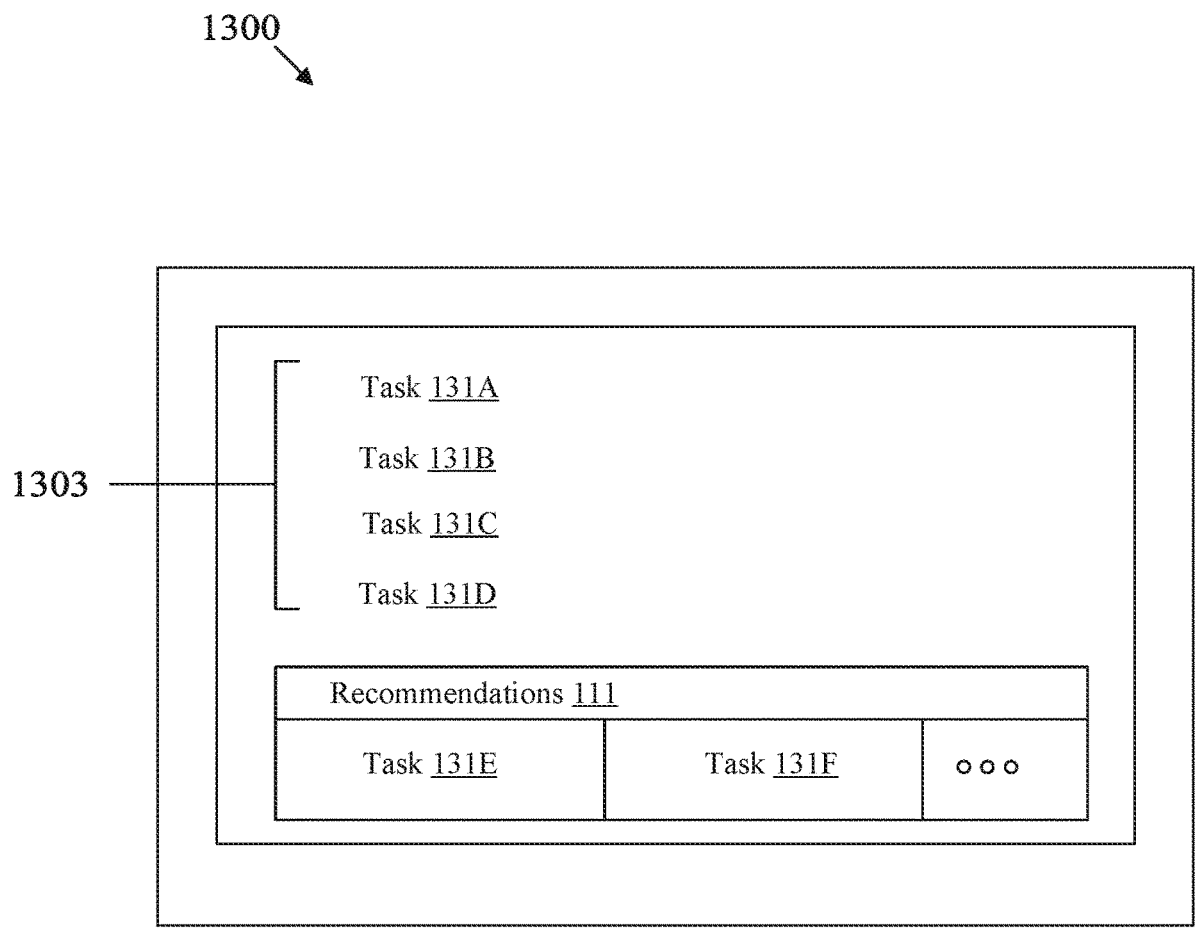
FIG. 13 is a diagram illustrating a user interface presented to an operator of the adaptive lighting system to display recommendations in accordance with an embodiment of the disclosure.

FIG. 13 is a diagram illustrating a UI 1300 presented to an operator of the adaptive lighting system 100 to display recommendations 111, in accordance with an embodiment of the disclosure. In some embodiments, the UI 1300 may be presented on the display 124 of the console 106 as a part of or an adjunct to the UI 126. In other embodiments, the UI 1300 may be displayed on a display of the electronic device implementing the VLA agent 103. In yet other embodiments, the UI 1300 may be displayed on a display of any electronic device accessible to the operator of the adaptive lighting system 100.

The UI 1300 displays multiple previous tasks 1303, which includes tasks 131A-D. The previous tasks 131A-D may include one or more previous tasks that have already been entered into the console 106 by an operator. As should be appreciated, the multiple previous tasks 1303 may include more or fewer than four previous tasks.

The UI 1300 also displays recommendations 111 for next tasks 131. As shown by FIG. 13, the recommendations 111 include tasks 131E and 131F. In various embodiments, the commands 131E and 131F are displayed as selectable buttons or other controls on the UI 1300. The operator interacts with the UI 1300 to select one or more of the tasks 131E or 131F to cause the corresponding task to be executed by the lighting devices 112. When the UI 1300 is displayed by the console 106, the console 106 is operably coupled to the lighting devices 112, and thus may directly input the tasks 131E and/or 131F to control the lighting devices 112. When the UI 1300 is displayed by an electronic device external to the console 106 and the UI 1300 receives a selection of one or more of the tasks 131E and/or 131F from the operator, the electronic device displaying the UI 1300 causes the console 106 to control the lighting devices 112 by sending the selected tasks 131E and/or 131F to the console 106.

The particular embodiments disclosed above are illustrative only, as the embodiments may be modified and practiced in different manners apparent to those skilled in the art having the benefit of the teachings herein. It is therefore evident that the particular embodiments disclosed above may be altered or modified and all such variations are considered within the scope of the present disclosure.

What is claimed is:

1. A method performed by a virtual lighting assistant (VLA) agent of an adaptive lighting system, the adaptive lighting system including a lighting control console and a plurality of lighting devices, the method comprising:
    obtaining a plurality of previous tasks from the lighting control console over a period of time, wherein a task comprises a sequence of one or more commands;
    maintaining access to historical data, telemetry data, context data, and a fixture library associated with the lighting control console, wherein the historical data comprises the previous tasks;
    determining a recommendation for a next task based on the fixture library and at least one of the historical data, the telemetry data, or the context data; and
    causing the recommendation for the next task to be displayed to an operator of the lighting control console,
    wherein the fixture library includes at least one of libraries, functions, variables or relevant data for use by the lighting control console to encode the one or more commands to control the plurality of lighting devices for performing the next task.

2. The method of claim 1, wherein the VLA agent is implemented by the lighting control console, wherein obtaining the previous tasks from the lighting control console over the period of time comprises monitoring the previous tasks executed by the lighting control console over the period of time, and wherein causing the recommendation for the next task to be displayed comprises displaying the recommendation for the next task on a display of the lighting control console.

3. The method of claim 1, wherein the VLA agent is implemented by a device external to the lighting control console, wherein obtaining the previous tasks from the lighting control console over the period of time comprises receiving the previous tasks executed by the lighting control console from the lighting control console, and wherein causing the recommendation for the next task to be displayed comprises sending the recommendation for the next task to the lighting control console.

4. The method of claim 1, wherein the historical data comprises at least one of data related to the previous tasks executed for an event, data related to the previous tasks executed for a plurality of different events, data related to the previous tasks executed for an event by a single operator of the adaptive lighting system, data related to the previous tasks executed for the event by a plurality of different operators of the adaptive lighting system, or data related to the previous tasks executed for a plurality of different events by the different operators of the adaptive lighting system.

5. The method of claim 1, wherein the historical data comprises mappings between one or more tasks executed by the lighting control console for an event and a timing for executing the one or more tasks.

6. The method of claim 1, wherein the context data comprises at least one of data related to environmental factors or pre-configured data related to the previous tasks performed by the lighting control console, and wherein the pre-configured data comprises at least one of a calendar or a local weather.

7. The method of claim 1, wherein the telemetry data comprises at least one of a position, a light path, a light speed, a dim level, an iris, a color, a gobo, a strobe, a strobe speed, a media file, effects, an orientation, an altitude, or spatial information of lighting devices within the adaptive lighting system.

8. The method of claim 1, wherein the fixture library comprises a plurality of functions compatible with a software implemented by the lighting control console.

9. The method of claim 1, wherein determining the recommendation for the next task comprises:
determining a pattern of tasks executed by the lighting control console for an event based on the historical data; and
determining the recommendation for the next task based on the pattern of commands executed by the lighting control console for the event.

10. The method of claim 1, wherein determining the recommendation for the next task comprises:
training data to develop a machine learning model for recommending the next task using natural language processing, wherein the training data comprises the historical data, the telemetry data, and the context data; and
predicting the recommendation for the next task using the machine learning model based on the historical data, telemetry data, and context data.

11. The method of claim 1, further comprising:
obtaining teleprompter data from a teleprompter device of the adaptive lighting system, wherein the teleprompter data comprises a teleprompter script;
identifying a keyword in the teleprompter script;
determining a sequence associated with the keyword; and
executing a cue associated with the sequence.

12. A virtual lighting assistant (VLA) agent implemented by a lighting control console, wherein the VLA agent comprises:
a memory comprising instructions;
a processor coupled to the memory and configured to execute the instructions, which cause the processor to be configured to:
monitor a plurality of previous tasks executed by the lighting control console over a period of time, wherein a task comprises a sequence of one or more commands;
store historical data, telemetry data, context data, and a fixture library associated with the lighting control console, wherein the historical data comprises the previous tasks;
determine a recommendation for a next task based on the fixture library and at least one of the historical data, the telemetry data, or the context data; and
display the recommendation for the next task on a user interface of the lighting control console.

13. The VLA agent of claim 12, wherein the instructions further cause the processor to be configured to determine patterns of previous tasks based on at least one of the historical data, the telemetry data, or the context data.

14. The VLA agent of claim 12, wherein the historical data comprises mappings between one or more tasks executed by the lighting control console for an event and a timing for executing the one or more tasks.

15. The VLA agent of claim 12, wherein the telemetry data comprises at least one of a position, a light path, a light speed, a dim level, an iris, a color, a gobo, a strobe, a strobe speed, a media file, effects, an orientation, an altitude, or spatial information of lighting devices within an adaptive lighting system.

16. A virtual lighting assistant (VLA) agent implemented in an adaptive lighting system, the adaptive lighting system including a lighting control console and a plurality of lighting devices, the VLA agent comprising:
a memory configured to store instructions; and
a processor coupled to the memory and configured to execute the instructions, which cause the processor to be configured to:
obtain a plurality of previous tasks from the lighting control console over a period of time, wherein a task comprises a sequence of one or more commands;
maintain access to historical data, telemetry data, context data, and a fixture library associated with the lighting control console, wherein the historical data comprises the previous tasks;
receive a recommendation for a next task from a VLA server, wherein the recommendation for the next task is based on the fixture library and at least one of the historical data, the telemetry data, or the context data; and
transmit the recommendation for the next task to the lighting control console for display to an operator of the lighting control console,
wherein the fixture library includes at least one of libraries, functions, variables or relevant data for use by the lighting control console to encode the one or more commands to control the plurality of lighting devices for performing the next task.

17. The VLA agent of claim 16, wherein the instructions further cause the processor to be configured to receive the previous tasks executed by the lighting control console from the lighting control console.

18. The VLA agent of claim 17, wherein the historical data comprises at least one of data related to the previous tasks executed for an event, data related to the previous tasks executed for a plurality of different events, data related to the previous tasks executed for an event by a single operator of the adaptive lighting system, data related to the previous tasks executed for the event by a plurality of different operators of the adaptive lighting system, or data related to the previous tasks executed for a plurality of different events by the different operators of the adaptive lighting system.

19. The VLA agent of claim 17, wherein the context data comprises at least one of data related to environmental factors or pre-configured data related to the previous tasks performed by the lighting control console, and wherein the pre-configured data comprises at least one of a calendar or a local weather.

20. The VLA agent of claim 17, wherein the instructions further cause the processor to be configured to:

determine a pattern of tasks executed by the lighting control console for an event based on the historical data; and determine the recommendation for the next task based on the pattern of commands executed by the lighting control console for the event.

* * * * *